United States Patent [19]

Sheppard

[11] Patent Number: 4,978,263
[45] Date of Patent: Dec. 18, 1990

[54] SLOT FORMING APPARATUS

[76] Inventor: Peter H. Sheppard, P.O. Box 459, Hanover, Pa. 17331-0459

[21] Appl. No.: 360,599

[22] Filed: Jun. 2, 1989

[51] Int. Cl.$^5$ ............................................. B23D 5/00
[52] U.S. Cl. .................................. 409/307; 409/313; 409/326
[58] Field of Search ............... 409/305, 307, 289, 313, 409/315, 317, 326, 330, 331

[56] References Cited

U.S. PATENT DOCUMENTS

| 807,123 | 12/1905 | March | 409/331 |
| 1,504,307 | 8/1924 | Anderson | 409/331 |
| 1,587,815 | 6/1926 | Boas | 409/305 |
| 2,909,967 | 10/1959 | Ranous | 409/307 |
| 3,250,181 | 5/1966 | Bashor | 409/304 |
| 3,367,237 | 2/1968 | Farque | 409/307 |
| 4,154,145 | 5/1979 | Bishop | 409/307 |

FOREIGN PATENT DOCUMENTS 59-115112 7/1984 Japan .

Primary Examiner—Daniel W. Howell
Attorney, Agent, or Firm—King & Schickli

[57] ABSTRACT

An apparatus for forming a slot in a workpiece is disclosed. A variable radius crank, driven by a generating head assembly imparts a reciprocating/oscillating motion to a connecting rod. The distal end of an extension of the rod includes a tool for machining the slot. The connecting rod is mounted in a reciprocable slide and is retained therein by a transverse pin. The slide translates the motion of the connecting rod to a substantially elliptical tool motion. Thus, the tool cuts a substantially elliptical slot in the workpiece. The profile of the slot can be passively modified by selection of a different ratio of the connecting rod to the extension. A computerized control system with a programmable controller governs the operation of the generating head assembly (and thus the crank throw) to actively modify the shape and length of the slot. The control system can also be utilized to further vary the throw of the crank to provide other functional modifications to the operation, such as providing additional clearance for the return stroke of the tool.

10 Claims, 2 Drawing Sheets

SLOT FORMING APPARATUS

TECHNICAL FIELD

The present invention relates to machine tools, and more specifically, to an apparatus for precisely forming a slot in a workpiece.

BACKGROUND OF THE INVENTION

Within the machining art, the desirability of providing an automatic machine tool capable of accurate machining of blind or internal slots in a hollow workpiece is well known. Blind slots are used, for example, in the hydraulic control field for fluid porting. Typically, these slots are situated along the side of an internal bore, or the like. The slots must be machined independently of the bore, adding to the complexity of the manufacturing operation.

U.S. Pat. No. 4,154,145 to Bishop discloses a typical prior art bore slotting machine. The apparatus disclosed is quite complex, including several cams, associated cam followers and reduction gears. As is well known, the inherent complexity of this device is a distinct disadvantage due to the relatively large power requirements for operation and the problem of wear in all of the mechanical parts and connections. These shortcomings provide decreased operating efficiency of the machine and greatly limit its overall utility. Nonetheless, this machine is the most popular machine on the market for this function.

A recent attempt at producing a simplified slot forming machine is disclosed in Japanese Patent Publication No. 59-115112 Sawada, published July 3, 1984. This machine includes a cam to impart a reciprocating motion to a slotting tool. The tool is retained within a pivotal slide body mounted on a spring. The depth of the cut is controlled by the position of a cam follower adjusted by a hydraulic cylinder. Although somewhat effective, this device does not address the problem of providing high quality slots of close tolerances, especially in harder metals. The spring mounting tends to allow for the possibility of tool chatter, especially at high production speeds, thereby decreasing the efficiency of the cutting operation. This tendency mostly occurs as the tool makes its forward and upward stroke; i.e. the pivoting movement of the slide body being resisted at this point only by the counteracting spring.

A need exists therefore for an improved blind slot forming apparatus which is relatively simple, thus avoiding the complexities of the prior art, while providing a smooth, consistent cutting action at production speeds.

SUMMARY OF THE INVENTION

It is, therefore, a primary object of the present invention to overcome the above-identified limitations and disadvantages of the prior art and provide a slot forming machine especially adapted for relatively high production work.

Another object of the present invention is to provide a slot forming apparatus for forming a smooth, continuous slot of close tolerance inside the bore of a metal workpiece.

Yet another object of the present invention is to provide a slot forming apparatus including a computerized control system.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, a slot forming apparatus is provided for precisely forming or cutting a blind slot in the bore of a workpiece, such as a power steering valve.

The preferred embodiment of the slot forming apparatus selected to illustrate the invention includes a generating head assembly for converting a rotating input to variable radius crank shaft type output. In other words, the generating head assembly is utilized to generate a variable throw, oscillating or crank shaft-type motion.

A connecting rod is rotatably attached to the variable radius crank. The connecting rod includes an extension mounting a tool for forming or machining the slot.

According to an important aspect of the present invention, a reciprocable slide is provided to mount the connecting rod to accommodate the oscillating motion to the tool. The slide includes a longitudinal bore for receiving the connecting rod. The connecting rod is pivotally retained in the slide by a transverse pin. The slide is retained upon a track allowing free reciprocating motion toward and away from the workpiece.

During operation, as the slide reciprocates axially, the tool on the distal end of the extension of the connecting rod reciprocates accordingly. Further, due to the rotatable connection of the pin and the connecting rod, the tool oscillates. The combination of these two motions produces the desired substantially elliptical cutting stroke with respect to the workpiece. As the radius of the crank is increased, the overall length and depth of the path traced by the tool increases proportionally. By varying the relative length or ratio of the two sections of the connecting rod, adjustments in depth and slot length can also be made. In this way, the slot can be machined to different profiles with varying depths and lengths. This passive adjustment is important in adapting the apparatus to different machining jobs.

Advantageously, the slot forming apparatus of the present invention includes a computerized control system for active precise cutting control. The control system includes a microprocessor controller for operating an electric stepping motor. As is known in the art, stepping motors are precisely positionable in relatively small increments and therefore well suited for this application. The stepping motor drives a ball screw mechanism. The adjusting nut of the ball screw mechanism is attached to a pivotable control lever to axially adjust the spindle within the generating head assembly. Thus, the control system/stepping motor combination precisely adjusts the axial position of the spindle to vary the radius of the crank. As the crank radius increases, the length and depth of the slot increase accordingly.

Advantageously, the control system can, at any time during a machining stroke, change the position of the tool relative to the workpiece. Thus, the shape of the slot can be further varied to suit the individual design requirements. Also, due to the precise positioning capability of the control system, other functions can be performed as well, such as retracting the tool upon the return stroke to avoid interference in a bore with a tight clearance. This additional active adjustment of the cutting tool expands the utility of the slot forming apparatus of the present invention well beyond that of the prior art.

Still other objects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWING

The accompanying drawing incorporated in and forming a part of the specification, illustrates several aspects of the present invention and together with the description serves to explain the principals of the invention. In the drawing.

Figure 1:
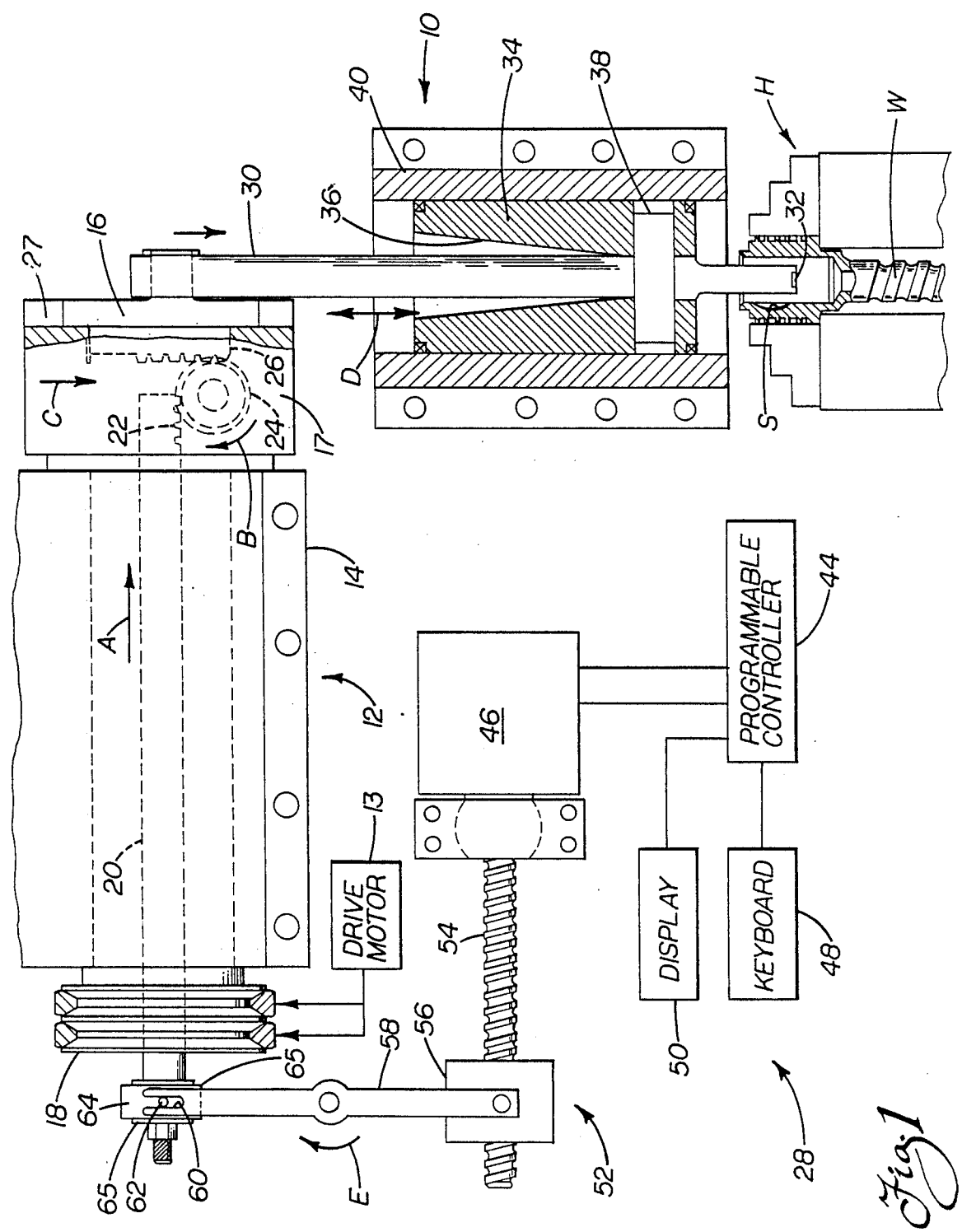
FIG. 1 is a schematical representation of the slot forming apparatus of the present invention.

Reference will now be made in detail to the present preferred embodiment of the invention, an example of which is illustrated in the accompanying drawing.

DETAILED DESCRIPTION OF THE INVENTION

Reference is now made to the drawing figures showing the slot forming apparatus 10 of the present invention providing a means for precisely forming a blind slot within the bore of a workpiece W. Advantageously, the slot forming apparatus 10 machines smooth, continuous slots in the workpiece W while avoiding the complexity of the prior art.

A generating head assembly 12 of the apparatus converts a rotating input from drive motor 13 to a crankshaft-type rotating output. As shown in FIG. 1, the generating head assembly 12 includes a spindle housing 14 and a variable radius crank 16 on the rotating head 17. As will be described in more detail below, the motion of the variable radius crank 16 is utilized to machine the desired substantially elliptical slot S in the workpiece W.

As shown, a pair of belt driven pulleys 18 driven by the external drive motor 13 and belts supply the rotating input to the generating head assembly 12. A spindle 20 is positionable axially to produce the desired variable radius for the crank 16.

As shown in phantom in FIG. 1, the spindle 20 includes a first end terminating in a rack 22. The rack is operatively engaged with a pinion gear 24 which, in turn, is operatively engaged with a second or output rack 26. Together, the first and second racks 22, 26 and the pinion gear 24 cooperate to vary the radius or throw of the crank 16 as shown by the motion arrows A, B and C.

The crank 16 is shown in both figures in the full line position in the zero output position. When the spindle 20 is displaced axially in the direction of action arrow A, the pinion gear 24 rotates in the direction indicated by action arrow B. This in turn, forces the second or output rack 26 in the direction of action arrow C. The crank 16 is attached to the second rack 26 and thus moves accordingly increasing the throw (see dashed line outline in FIG. 2). The crank 16 is slidably retained in a dovetail slot 27 within the rotating head 17 (see also FIG. 2). Advantageously, the crank 16 can be positioned to any point within zero and full stroke range by the above described operation of the generating head assembly. That is, by simply axially positioning the spindle 20, the throw of the variable radius crank 16 is precisely controlled. Advantageously, the radius of the crank 16 can be varied while the generating head 17 is rotating. The crank 16 is therefore actively positionable; i.e. the throw of the crank 16 can be varied at all times during operation. A computerized control system 28 is provided to provide this adjusting function. The control system 28 allows a precise, repeatable positioning and further allows fully automatic operation of the apparatus 10, as will be described in more detail below.

As shown in FIG. 1, a connecting rod 30 is rotatably attached to the variable radius crank 16 at one of its free ends. Of course, the position of the crank 16 relative to the head 17 determines the magnitude of the oscillation and reciprocation of the connecting rod 30.

Figure 2:
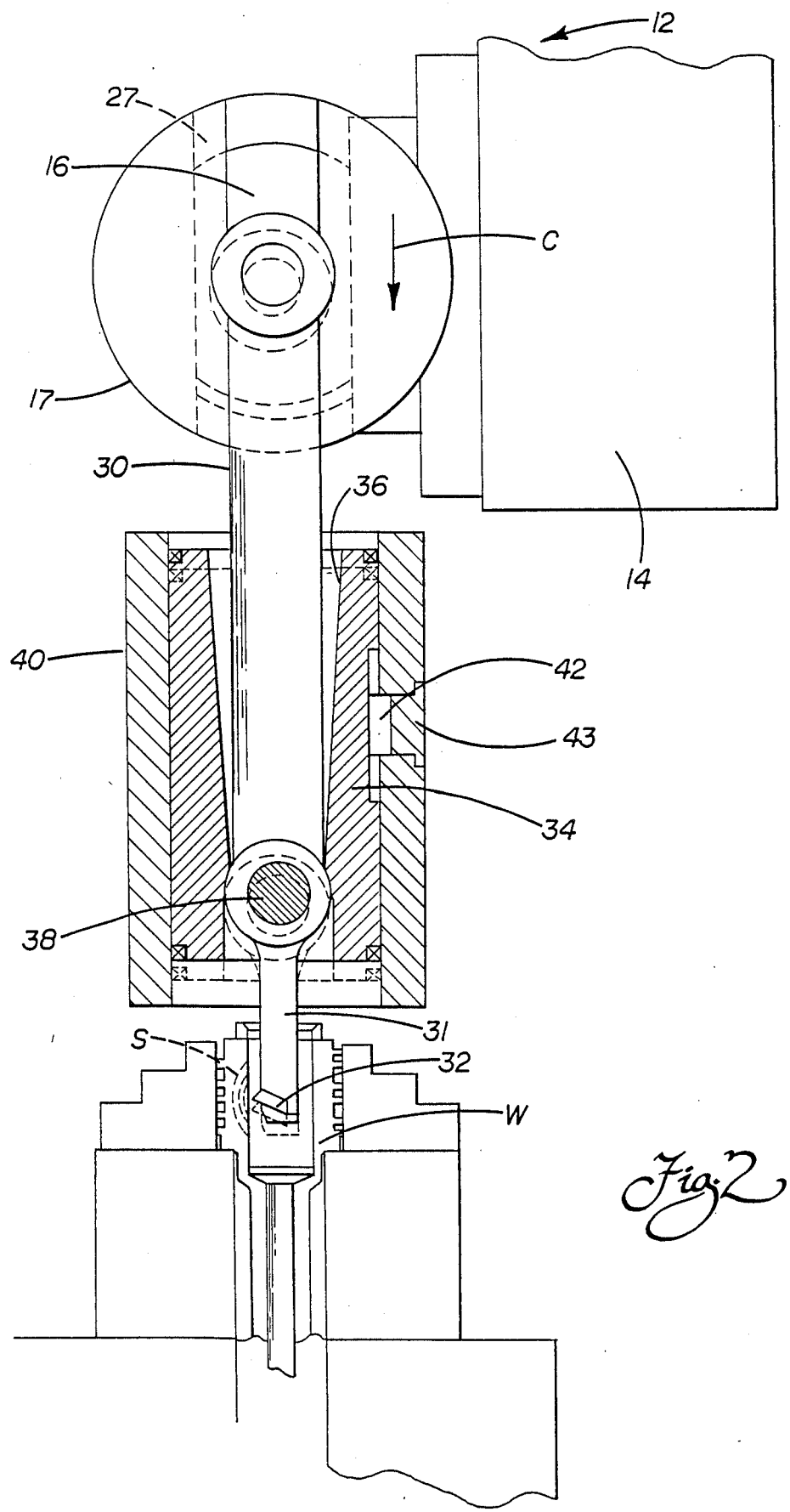
FIG. 2 is a side view of the slot forming apparatus of the present invention with the crank and the connecting rod shown also in dashed line position to make incremental cuts (also dashed line outline).

As shown, the connecting rod 30 includes an aligned rod extension 31 with a cutting tool 32 carried at the distal end for machining slot S (see FIG. 2). The workpiece W is securely retained within a machining holder, such as an adjustable chuck. As shown, the workpiece W is a valve for a power steering gear and the slots S (see also FIG. 1) being formed are control ports for transfer of pressurized hydraulic fluid. It is to be understood that other types of workpieces can of course be successfully machined with the apparatus 10 of the present invention.

According to an important aspect of the present invention, a reciprocable, cylindrical slide 34 (shown in cross-section for clarity) is provided to translate the reciprocating motion of the connecting rod 30 and the extension 31 during operation to provide the desired compound reciprocating/oscillating (or elliptical) motion to the tool 32. The slide 34 includes a longitudinal bore 36 for receiving the connecting rod 30. The connecting rod 30 is pivotably retained therein by a transverse pin 38. The slide 36 is slidingly engaged within a mating cylindrical guide track 40 in a manner similar to a piston in a cylinder. The key 42 sliding in a keyway prevents rotation of the slide. A cap 43 retains the key in position, and allows removal of the key.

With the key 42 removed, the operator is able to substitute a different slide 34/connecting rod 30, 31 assembly with a different length ratio of arm 30 to extension 31. As will be realized, this provides the passive adjustment to provide a slot S of a desired different depth and/or profile.

During operation, with the crank 16 moved off-center, the slide 34 being attached to the connecting rod 30 reciprocates axially (see FIG. 1, action arrow D). Concurrent with the reciprocating motion and as induced by the transverse pin 38, the distal end of the connecting rod extension 31 (including the tool 32) moves in the desired oscillating motion. This motion traces a substantially elliptical path and thereby produces the desired substantially elliptical shape of the slot S.

As shown by the several phantom lines indicating the slot in FIG. 2, the slot S is progressively machined to increasingly greater lengths and depths. This increasing size of the slot S is simply directed by increasing the radius or throw of the crank 16. Thus, the size of the slot can easily be varied for each desired application.

Advantageously, the computerized control system 28 provides a means for precisely controlling this size and shape of the slot S. As shown in FIG. 1, the control system 28 includes a microprocessor controller 44 connected to a stepping motor 46. As shown, a keyboard 48 and a display 50 are provided to facilitate operator interaction with the microprocessor controller 44. The display 50 can be a video display and/or a printer, as desired.

The stepping motor 46 is utilized to operate a ball screw mechanism 52 including a ball screw 54. The ball screw is rotated by the operation of the stepping motor 46 and moves an adjusting nut 56 accordingly. Because the ball screw 54 and the adjusting nut 56 are precisely machined and fitted, the position of the adjusting nut is directly related to the rotational position of the stepping motor 46. Due to this precise positioning capability of the stepping motor 46, the position of the adjusting nut 56, is therefore precisely variable.

As shown, the adjusting nut 56 is connected to a pivotable control lever 58. The motion of the control lever 58 for increasing the throw of the variable radius crank 16 (for example) is shown by the action arrow E. Of course, the control lever 58 can be simply moved in the opposite direction to decrease the throw of the crank 16, as desired.

In order to move the spindle 20, the distal end of the control lever 58 includes a yoke 60 for slidingly receiving a pin 62. The pin 62 is mounted upon the outside of a bearing 64 mounted on the spindle 20. The pin 62 and the corresponding pin on the opposite side remains stationary with respect to the yoke 60 during rotation of the spindle 20. A pair of shoulders 65 fix the bearing and thus the pins 62 axially with respect to the spindle 20. Thus, it can be seen that by movement of the adjusting nut 56, the axial position of the spindle 20 can be actively adjusted during operation by shifting of the bearing 64 and thus the spindle 20.

Advantageously, the precise positioning capability of the control system 28 provides for a substantially instantaneous change in the position of the tool relative to the workpiece W. Thus, the shape of the slot S can be varied to suit individual requirements. Further, the position of the tool 32 can be varied to provide further functional modifications, such as providing additional clearance on the return stroke.

In order to cut more than one slot, the workpiece W is simply released from the holder and indexed to the next position. Means, not shown, may be provided for automatic indexing, if desired.

In summary, numerous benefits result from utilizing the teachings of the present invention. The slot forming apparatus 10 provides a means for simply and reliably machining a blind slot S in a hollow workpiece W. The apparatus 10 includes a computerized control system 28 for precisely adjusting the position of the tool 32 relative to the workpiece W at all times, even during operation. Thus, smooth functioning and precise control is assured. The apparatus is simple in design for enhanced reliability, and employs no springs or other elements that can cause tool chatter and lead to low quality machining. Further, the operation of the slot forming apparatus 10 can be accomplished automatically and programmed through the controller 44.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as is suited to the particular use contemplated. All such modifications and variations are within the scope of the invention as determined by the appended claims when interpreted in accordance with breadth to which they are fairly, legally and equitably entitled.

I claim:

1. An apparatus for cutting a slot in a workpiece, comprising:
   an adjustable throw crank;
   means for varying the throw of said crank;
   a connecting rod in operative engagement with said crank, said connecting rod including a tool mounted on the distal end opposite said crank; and
   drive means in operative engagement with said connecting rod through said crank for imparting a reciprocating/oscillating motion to said tool,
   whereby an elliptically shaped slot is formed in said workpiece.

2. The apparatus of claim 1 wherein said drive means includes a slide on a stationary track, said connecting rod being pivotally mounted on a transverse pin carried by said slide.

3. An apparatus for cutting a slot in a workpiece, comprising:
   an adjustable throw crank;
   means for varying the throw of said crank;
   a connecting rod in operative engagement with said crank, said connecting rod including a tool mounted on the distal end opposite said crank;
   drive means in operative engagement with said connecting rod for imparting a reciprocating/oscillating motion to said tool, and
   said varying means including a generating head assembly having a spindle mounted for axial adjustment, and means for axially adjusting said spindle, and gear means responsive to said spindle to adjust the throw of said crank;
   whereby an elliptically shaped slot is formed in said workpiece.

4. The apparatus of claim 3 wherein said spindle adjusting means includes a pivotable control lever for engaging said spindle.

5. The apparatus of claim 4 further including a ball screw mechanism for actuating said control lever, and a stepping motor for actuating said ball screw mechanism.

6. The apparatus of claim 5 further including a programmable controller for operating said stepping motor.

7. The apparatus of claim 3 wherein said gear means includes a rack on said spindle, and a rack on said crank, and a pinion connecting the racks.

8. The apparatus of claim 3 wherein said drive means includes a rotary drive motor connected directly to said spindle.

9. An apparatus for cutting a slot in a workpiece, comprising:

an adjustable throw crank;

means for varying the throw of said crank;

a connecting rod in operative engagement with said crank, said connecting rod including a tool mounted on the distal end opposite said crank;

drive means in operative engagement with said connecting rod for imparting a reciprocating/oscillating motion to said tool;

said drive means including a slide on a stationary track, said connecting rod being pivotally mounted on a transverse pin carried by said slide; and said slide including a longitudinal bore for receiving said connecting rod;

whereby an elliptically shaped slot is formed in said workpiece.

10. The apparatus of claim 9 wherein said connecting rod includes an extension on the opposite side of said pin, said tool being mounted on said extension, whereby the profile of the slot depends on the ratio of the length of the connecting rod to the extension.

* * * * *